United States Patent Office
3,632,597
Patented Jan. 4, 1972

3,632,597
INSECTICIDAL 5-PHOSPHORYLACETAMIDO- AND 5 - PHOSPHONYLACETAMIDO SUBSTITUTED-1,2,4 THIADIAZOLES
Edmund J. Gaughan, Kensington, Calif., assignor to Stauffer Chemical Company, New York, N.Y.
No Drawing. Filed Jan. 2, 1970, Ser. No. 431
Int. Cl. C07d 91/00
U.S. Cl. 260—306.8 D
9 Claims

ABSTRACT OF THE DISCLOSURE

Novel 5-phosphorylacetamido and 5-phosphonyl-acetamido-3-alkyl thio or alkyl - 1,2,4 - thiadiazoles are disclosed. The 5-dithiophosphorylacetamido derivatives, such as 5-(O,O-diethyldithiophosphoryl acetamido)-3-methylthio-2,3,4-thiadiazole, are preferred. The compounds are useful as insecticides and are effective against a variety of insects when applied as indicated.

BACKGROUND OF THE INVENTION

This invention relates to novel compositions of matter and their use as insecticides. More particularly, this invention relates to compounds having the formula

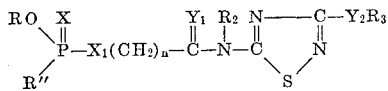

wherein R and $R_3$ are selected from the group consisting of lower alkyl, preferably having from 1 through 5 carbon atoms, lower alkenyl, preferably containing 2 through 5 carbon atoms, haloalkyl, preferably having 1 to 5 carbon atoms, haloalkenyl, preferably having 2 through 5 carbon atoms, cycloalkyl having 3 through 6 carbon atoms; $R_2$ is selected from the group consisting of H and alkyl of 1 through 4 carbon atoms; $R''$ is a member selected from the group consisting of R and R—O; $n$ is a whole number from 1 through 3; X and $X_1$ are selected from the group consisting of oxygen and sulfur, and $Y_1$ and $Y_2$ are selected from the group consisting of oxygen and sulfur. The invention also comprises the use of materials having the above-described formula in novel insecticidal compositions and methods.

In a preferred form, the invention relates to compositions and their use as insecticides having the formula

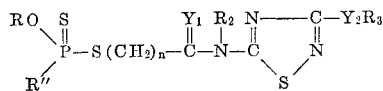

wherein R and $R_3$ are selected from the group consisting of alkyl containing 1 through 5 carbon atoms, alkenyl containing 2 through 5 carbon atoms, haloalkyl containing 1 through 5 carbon atoms, haloalkenyl containing 2 through 5 carbon atoms; $R_2$ is selected from the group consisting of H and alkyl of 1 through 4 carbon atoms, $R''$ is a member selected from the group consisting of R and R—O; $n$ is a whole number from 1 through 3, $Y_1$ and $Y_2$ are selected from the group consisting of oxygen and sulfur. In this embodiment, $R_3$ is preferably alkyl containing 1 through 5 carbon atoms. In its most preferred form, the invention relates to compositions having the formula

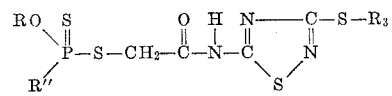

wherein R and $R_3$ are lower alkyl containing 1 through 5 carbon atoms and $R''$ is a member selected from the group consisting of R and R—O. The term halogen or prefix halo- used in describing the compounds of the present invention encompasses chlorine, bromine, iodine and fluorine and includes mono- and poly-substituted moieties.

The compositions of the present invention are particularly useful as insecticides. The compounds of this invention may be prepared by reacting in solution (such as in dioxane) a 3-$R_3$Y-5($R_2$-amino)-1,2,4-thiadiazole with a halo carboxylic acid anhydride or a halo thio acid anhydride and then treating the resulting product with, e.g., the appropriate O,O-R,R-phosphate, R,R-dithiophosphate or O,P-R,R-dithiophosphonate, in the presence of a base such as triethylamine.

The concentrations of the reactants employed are not particularly critical, although generally an excess of the acetic anhydride will be employed. A suitable concentration will be from about 1.0 mol to about 2.5 mols of e.g., haloacetyl anhydride or halothioacetyl anhydride per mol of 3-RY-5($R_2$ amino)-1,2,4-thiadiazole. Similarly, the reaction between this haloacetyl derivative and the desired phosphate, thiophosphate, dithiophosphate or phosphonate, thiophosphonate or dithiophosphonate may be made on an approximate mol per mol basis. As indicated, the first reaction is preferably carried out under anhydrous conditions in an inert solvent, while the second reaction is preferably carried out in the presence of a base such as triethylamine. In general, reactions of this type are exothermic so that the addition of heat is not required and, in actuality, cooling may sometimes be necessary to control the reaction rate. The reaction will normally be carried out at a temperature of from about —25° C. to about 100° C. Pressures may be atmospheric, subatmospheric or greater than atmospheric as desired. Preparation of the compounds of this invention is illustrated by the following examples:

EXAMPLE I 3-methylthio-5-amino-1,2,4-thiadiazole

Sodium thiocyanate (17.1 g.) is dissolved in 135 ml. of anhydrous methanol and methyl isothiuronium sulfate (23.7 g.) added. Seventy-four (74) grams of a 25 percent solution of sodium methoxide in methanol is prepared by reacting sodium with methanol. One-seventh (1/7) of the methoxide solution is added to the first solution at —15°. The rest of the methoxide solution and a solution of bromine (27.3 g.) in 75 ml. of methanol is added simultaneously over 45 minutes. The mixture is then allowed to stand without cooling for about one hour and is then neutralized with hydrochloric acid. The solvent is removed in vacuo and the residue extracted with cold water. The insoluble portion is filtered, dried and recrystallized from benzene-ethanol.

EXAMPLE II

Preparation of 5-chloroacetamide-3-methylthio-1,2,4-thiadiazole

The amino thiadiazole (14.7 g.) produced in Example I, above, and chloroacetic anhydride (18 g.) in 125 ml.

of dioxane, are stirred at 80° to 85° bath temperature for about three and one-half hours. The mixture is then cooled, poured into 300 ml. of water and the product filtered, washed with water and hexane, and then dried.

EXAMPLE III

Preparation of 5-(O,O-diethyldithiophosphoryl acetamido)-3-methylthio-1,2,4-thiadiazole The chloroacetamido thiadiazole (11.2 g.) produced in the above Example II is dissolved in 45 ml. of dimethyl formamide. O,O-diethyldithiophosphate (9.7 g.) is dissolved in 15 ml. of dimethyl formamide and triethylamine (5.3 g.) was added with cooling. This solution is then added to the chloroacetamido thiadiazole solution with stirring, followed by 2 g. more of triethylamine. The mixture is then warmed to 50° to 55° for about two hours. The solution is cooled and poured into 150 ml. of cold water. The product is extracted with benzene, washed and dried in vacuo. The residue is then saturated with hexane, evaporated and then dissolved in carbon tetrachloride. The solution is then filtered, evaporated in vacuo to obtain 5-(O,O-diethyldithiophosphorylacetamido)-3-methylthio-1,2,4-thiadiazole.

EXAMPLE IV

Preparation of 5-(O,P-diethyldithiophosphonyl acetamido)-3-methylthio-1,2,4-thiadiazole The reaction is carried out as in Examples II and III except that (O,P-diethyl) dithiophosphonate is employed instead of the dithiophosphate. The product is worked up as described.

EXAMPLE V

Preparation of 5-(O,O-methylethyldithiophosphorylacetamido)-3-methoxy-1,2,4-thiadiazole The procedure is similar to that of Examples II and III, except that 5-amino-3-methoxy-1,2,4-thiadiazole is employed instead of the thio-thiadiazole and O,O-methylethyldithiophosphate is employed instead of the O,O-diethyldithiophosphate.

EXAMPLE VI

Preparation of 5-[O,O-di(chlorobutenyl)dithiophosphoryl acetamido]-3-ethoxy-1,2,4-thiadiazole The procedure is similar to that of Examples II and III, except that 5-amino-3-ethoxy-1,2,4-thiadiazole is employed instead of the thio-thiadiazole, and O,O-di(chlorobutenyl)dithiophosphate is employed instead of the O,O-diethyldithio phosphate.

EXAMPLE VII

Preparation of 5-(O,O-cyclopentylmethyldithiophosphoryl methylacetamido)-3-methylthio-1,2,4-thiadiazole The procedure is similar to that of Examples II and III, except that 5-methylamino-3-methoxy, 1,2,4-thiadiazole is employed instead of the thio-thiadiazole, and O,O-cyclopentylmethyl dithiophosphate is employed instead of the O,O-diethyldithiophosphate.

EXAMPLE VIII

Preparation of 5-(O,O-diethyldithiophosphorylthionaacetamido)-3-methylthio-1,2,4-thiadiazole The procedure is similar to that of Example II and III, except that chlorothionoacetyl anhydride is employed instead of chloroacetic anhydride.

EXAMPLES IX

Preparation of 5[O,O-di(propene-1)thiophosphorylacetamido]-3-methylthio-1,2,4-thiadiazole The procedure is similar to that of Example II and III, except that O,O-di(propene-1)dithiophosphate is employed instead of the O,O-diethyl dithiophosphate.

Compounds which may be prepared according to the invention include:

(1) 5-(O,O-diethyldithiophosphorylacetamido)-3-methylthio-(1,2,4-thiadiazole)
(2) 5-(O,P-diethyidlthiophosphonylacetamido)-3-methylthio-(1,2,4-thiadiazole)
(3) 5-(O,O-ethylcyclobutylthiophosphorylacetamido)-3-ethoxy-(1,2,4-thiadiazole)
(4) 5-(O,O-methylethyldithiophosphorylacetamido)-3-methoxy-(1,2,4-thiadiazole)
(5) 5-(O,P-chloromethylethyldithiophonylacetamido)-3-ethoxy-(1,2,4-thiadiazole)
(6) 5-[O,O-di(chlorobutenyl)dithiophosphorylacetamido]-3-ethoxy-(1,2,4-thiadiazole)
(7) 5-(O,O-cyclopentylmethyldithiophoryacetamido)-3-methoxy-(1,2,4-thiadiazole)
(8) 5-(O,O-cyclopentylmethyldithiophosphorylacetamido)-3-methylthio-(1,2,4-thiadiazole)
(9) 5-(O,O-dipropyldithiophosphorylacetamido)3-ethylthio-(1,2,4-thiadiazole)
(10) 5-(O,P-ethylmethyldithiophosphonylacetamide)-3-methylthio-(1,2,4-thiadiazole)
(11) 5-(O,O-diethyldithiophosphorylthionoacetamido)-3-ethylthio-(1,2,4-thiadiazole)
(12) 5-(O,O-dimethylthiophosphorylthionoacetamido)-3-methylthio-(1,2,4-thiadiazole)
(13) 5-(O,O-cyclopenylmethyldithiophosphoryl-methylacetamido)-3-methylthio-(1,2,4-thiadiazole)
(14) 5-(O,O-diethyldithiophosphorylthionoacetamido)-3-methylthio-(1,2,4-thiadiazole)
(15) 5-(O,O-diethyldithiophosphorylthionoacetamido)-3-propylthio-(1,2,4-thiadiazole)
(16) 5-[O,P-di-(propene-1)dithiophosphonylacetamido]3-methylthio-(1,2,4-thiadiazole)
(17) 5-[O,O-di(propene-1)dithiophosphorylacetamido]3-methylthio-(1,2,4-thiadiazole)
(18) 5-(O,P-isopropylethyl-dithiophosphonylacetamido)-3-methylthio-(1,2,4-thiadiazole)
(19) 5-(O,O-isopropylethyldithiophosphorylacetamido)-3-methylthio-(1,2,4-thiadiazole)
(20) 5-(O,P-isobutylenethyldithiophosphonylacetamido)-3-methylthio-(1,2,4-thiadiazole)
(21) 5-(O,O-diethyldithiophosphorylacetamido)-3-cyclohexylthio-(1,2,4-thiadiazole)
(22) 5-(O,O-isobutylethyldithiophosphorylacetamido)-3-propylthio-(1,2,4-thiadiazole)
(23) 5-(O,O-isopentylethyldithiophorylacetamido)-3-isopropylthio-(1,2,4-thiadiazole)

In order to demonstrate usefulness, the following tests were conducted using the compounds designated as 1, 2, 10, 18, and 20 in the list as exemplary of the compounds of the invention.

The following insect species were used in evaluation tests for insecticidal activity:

(1) Housefly (HF)—*Musca domestica* (Linn.)
(2) German roach (GR)—*Blatella germanica* (Linn.)
(3) Salt-marsh caterpillar (SMC)—*Estigmene gerea* (Drury)
(4) Lygus bug (LB)—*Lygus hesperus* (Knight)
(5) Bean aphid (BA)—*Aphis fabae* (Scop.)

The housefly (HF) was used in evaluation tests of the selected compounds for insecticidal activity in the following manner. A stock solution containing 100 μg./ml. of the toxicant in an appropriate solvent was prepared. Aliquots of this solution were combined with 1 milliliter of an acetone-peanut oil solution in a glass Petri dish and allowed to dry. The aliquots were employed to achieve desired toxicant concentration ranging from 100 μg. per Petri dish to that at which 50% mortality was attained. The Petri dishes were placed in a circular cardboard cage, closed on the bottom with cellophane and covered on top with cloth netting. Twenty-five female houseflies, from three to five days old, were introduced into the cage and the percent mortality was recorded after 48 hours. The LD–50 values are expressed in terms of μg. per 25 female flies. The results of this insecticidal evaluation test are given in the table below under "HF."

In the German cockroach (GR) test, 10 approximately one-month old nymphs of the German cockroach (GR) were placed in circular cardboard cages sealed on one end with cellophane and covered by a cloth netting on the other. Aliquots of the toxicants, dissolved in an appropriate solvent, were diluted in water containing 0.002% of a wetting agent, Sponto 221®, (a polyoxyether of alkylated phenols blended with organic sulfonates). Test concentrations ranged from 0.1% downward to that at which 50% mortality was obtained. Each of the aqueous suspensions of the candidate compounds were sprayed onto the insects through the cloth netting by means of a hand-spray gun. Percent mortality in each case was recorded after 72 hours, and the LD–50 values expressed as percent of toxicant in the aqueous spray were recorded. These values are reported under the column "GR" in the table below.

For testing the salt marsh caterpillar, test solutions were prepared in a similar manner and at similar concentrations to those employed in testing the German cockroach. Sections of bitter dock (*Rumex obtusifolus*) leaves, 1–1.5 inches in length were immersed in the test solutions for 10 to 15 seconds and placed on a wire screen to dry. The dried leaf was placed on a moistened piece of filter paper in a Petri dish and infested with 5–3rd Instar larvae. Mortality of the larvae was recorded after 72 hours and the LD–50 values are expressed as percent active ingredient in the aqueous suspension. The results are reported in the table below in the column designated SMC.

The Lygus bug (LB), *Lygus hesperus*, was tested in the same manner as the German cockroach, except that ten to twenty-five insects were used per cage. The caged insects were sprayed with the candidate compounds at concentrations ranging from 0.05% downward to that at which 50% mortality was obtained. After twenty-four and seventy-two hours, counts were made to determine living and dead insects, and the LD–50 (percent) values were calculated. These values are reported under the column "LB" in the table.

The insect species black bean aphid (BA), *Aphis fabae* (Scop.), was also employed in the test for insecticidal activity. In this test, young nasturtium, Tropaeolum sp., plants, approximately 2 to 3 inches tall, were infested with approximately 50–75 of the aphids. The test chemical was dissolved in acetone, added to water which contains a small amount of Sponto 221®, an emulsifying agent. The solution was applied as a spray to the infested plants. Concentrations ranged from 0.05 percent downward until an LD–50 value was achieved. These results are given in the table under the column "BA."

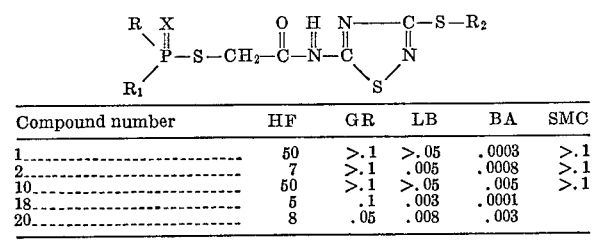

| Compound number | HF | GR | LB | BA | SMC |
| --- | --- | --- | --- | --- | --- |
| 1 | 50 | >.1 | >.05 | .0003 | >.1 |
| 2 | 7 | >.1 | .005 | .0008 | >.1 |
| 10 | 50 | >.1 | >.05 | .005 | >.1 |
| 18 | 5 | .1 | .003 | .0001 | |
| 20 | 8 | .05 | .008 | .003 | |

The compounds of the invention also demonstrate acaricidal and plant systemic activity in tests for these properties.

As can be seen by the test results, the compounds of the invention are useful in killing insects. The compounds may be applied directly to the insects or may be applied to a locus to be protected. In either event, it is, of course, necessary that the insects receive an effective or insecticidal dosage or amount i.e., an amount sufficient to kill the insects. Since the amount of active agent required will vary according to the insects treated, precise limits on the amounts employed cannot be given. The tests set forth above indicate exemplary amounts which may be employed, as will readily be appreciated by those of skill in the art. Determination of the optimum effective concentration for a specific application is readily conducted by routine porcedures, as will also be apparent to those skilled in the art.

The compounds are normally employed with a suitable carrier and may be applied as a dust, spray, drench, or aerosol. The compounds thus may be applied in combination with solvents, diluents, various surface agents (for example detergents, soaps or other emulsifying or wetting agents, surface active clays) carrier media, adhesives, spreading agents, humectants and the like. They may also be combined with other biologically active compositions, including fungicides, bactericides, and algaecides, other insecticides, growth stimulators, acaricides, herbicides, molluscicides, etc., as well as with fertilizers soil modifiers, etc. The compounds of the invention may be used in combination with an inert carrier and a surface active or emulsifying agent, and may also be applied in combination with other biologically active materials, in conjunction with a carrier and a surface active or emulsifying agent. The solid and liquid formulations can be prepared by any of the conventional methods well-known by those skilled in the art. The compositions may be applied to or in textiles, leather, paint, soaps, paper, wood, plastic, oil, and other substances.

Various changes and modifications may be made without departing from the spirit and the scope of the invention described herein, as will be apparent to those skilled in the art to which it pertains.

I claim:
1. Compounds having the formula

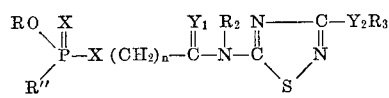

wherein R and $R_3$ are selected from the group consisting of lower alkyl containing from 1 through 5 carbon atoms, lower alkenyl containing 2 through 5 carbon atoms, haloalkyl containing 1 to 5 carbon atoms, haloalkenyl containing 2 through 5 carbon atoms, cycloalkyl containing 3 through 6 carbon atoms; $R_2$ is selected from the group consisting of H and alkyl of 1 through 5 carbon atoms; R" is a member selected from the group consisting of R and R—O; $n$ is a whole number from 1 through 3; X and $X_1$ are selected from the group consisting of oxygen and sulfur, and $Y_1$ and $Y_2$ are selected from the group consisting of oxygen and sulfur.

2. The compounds of claim 1 wherein X is S, $X_1$ is S, and R and $R_3$ are selected from the group consisting of alkyl containing 1 through 5 carbon atoms, alkenyl containing 2 through 5 carbon atoms, haloalkyl containing 1 through 5 carbon atoms, haloalkenyl containing 2 through 5 carbon atoms, $R_2$ is selected from the group consisting of H and alkyl of 1 through 4 carbon atoms, R" is a member selected from the group consisting of R and R—O; $n$ is a whole number from 1 through 3, $Y_1$ and $Y_2$ are selected from the group consisting of oxygen and sulfur.

3. The compounds of claim 2 wherein $R_3$ is alkyl containing 1 through 5 carbon atoms.

4. The compounds of claim 2 wherein $Y_1$ is O, $Y_2$ is S, $R_2$ is H, and R and $R_3$ are lower alkyl containing 1 through 5 carbon atoms.

5. The compound of claim 1 wherein R is ethyl, $R_3$ is methyl, $Y_1$ is O, $Y_2$ is S, X and $X_1$ are S, $n$ is 1, and R" is ethoxy.

6. The compound of claim 1 wherein R is ethyl, $R_3$ is methyl, $Y_1$ is O, $Y_2$ is S, X and $X_1$ are S, $n$ is 1, and R'' is ethyl.

7. The compound of claim 1 wehrein R is ethyl, $R_3$ is methyl, $Y_1$ is O, $Y_2$ is S, X and $X_1$ are S, $n$ is 1, and R'' is methyl.

8. The compound of claim 1 wherein R is isopropyl, $R_3$ is methyl, $Y_1$ is O, $Y_2$ is S, X and $X_1$ are S, $n$ is 1, and R'' is ethyl.

9. The compound of claim 1 wherein R is isobutyl, $R_3$ is methyl, $Y_1$ is O, $Y_2$ is S, X and $X_1$ are S, $n$ is 1, and R'' is isobutyl.

References Cited

UNITED STATES PATENTS

| | | | |
|---|---|---|---|
| 3,025,303 | 3/1962 | Ifversen et al. | 260—306.8 |
| 3,406,179 | 10/1968 | Jamison | 424—200 |
| 3,517,027 | 6/1970 | Largman et al. | 424—200 |

ALEX MAZEL, Primary Examiner

R. J. GALLAGHER, Assistant Examiner

U.S. Cl. X.R.

424—200